United States Patent [19]
Co et al.

[11] Patent Number: 5,502,750
[45] Date of Patent: Mar. 26, 1996

[54] DIGITAL JITTER ATTENUATOR USING SELECTION OF MULTI-PHASE CLOCKS AND AUTO-CENTERING ELASTIC BUFFER FOR A TOKEN RING NETWORK

[75] Inventors: Ramon S. Co, Trabuco Canyon; Lance K. Lee, Milpitas, both of Calif.

[73] Assignee: Pericom Semiconductor Corp., San Jose, Calif.

[21] Appl. No.: 259,910

[22] Filed: Jun. 15, 1994

[51] Int. Cl.$^6$ ........................................ H04L 7/00
[52] U.S. Cl. .................. 375/372; 375/373; 370/105.3
[58] Field of Search ........................ 375/118, 119, 375/120; 370/105.3; 307/511, 262; 328/155, 133; 331/1 A

[56] References Cited

U.S. PATENT DOCUMENTS

| | | | |
|---|---|---|---|
| 4,805,198 | 2/1989 | Stern et al. | 375/118 |
| 4,941,156 | 7/1990 | Stern et al. | 375/118 |
| 4,942,593 | 7/1990 | Whiteside et al. | 375/118 |
| 5,081,655 | 1/1992 | Long | 375/374 |
| 5,090,025 | 2/1992 | Marshal et al. | 375/4 |
| 5,150,386 | 9/1992 | Stern et al. | 375/118 |
| 5,162,746 | 11/1992 | Ghoshal | 375/118 |
| 5,245,637 | 9/1993 | Gersbach et al. | 375/374 |
| 5,297,180 | 3/1994 | Upp et al. | 375/112 |

OTHER PUBLICATIONS

J. C. Bellamy, *Digital Telephony*, Wiley, 1982 pp. 327–329.

*Primary Examiner*—Stephen Chin
*Assistant Examiner*—T. Ghebretinsae
*Attorney, Agent, or Firm*—Stuart T. Auvinen

[57] ABSTRACT

A jitter attenuator receives data and a receive clock extracted from an input data stream. A transmit clock is generated for retransmitting the data. The transmit clock has less jitter than the receive clock but has the same average frequency. An elastic buffer or FIFO is necessary to buffer the data. The receive clock is divided into a series of write clocks for writing data into the elastic buffer, and the transmit clock is also divided into a series of read clocks for reading data from the elastic buffer. A series of multi-phase clocks is used to generate the transmit clock. The multi-phase clocks all have the same frequency but are offset in phase from one another. A phase selector, under control of a counter, selects one of the multi-phase clocks to be the transmit clock. The counter is incremented or decremented by a phase comparator. The phase comparator compares the phase of one of the write clocks to the phase of one of the read clocks. The counter is incremented when the phase of the write clock lags the read clock, selecting a multi-phase clock with a more retarded phase, but the counter is decremented when the write clock leads the read clock, selecting a multi-phase clock with a more advanced phase. Thus the phase of the transmit clock is adjusted by the phase comparison of the write and read clocks for the elastic buffer. The elastic buffer is forced to half-full by comparing a write and read clock that are separated by half the capacity of the buffer. The phase, rather than the frequency, is adjusted, eliminating the feedback to an external VCO, allowing the jitter attenuator to be integrated on a single silicon substrate.

16 Claims, 5 Drawing Sheets

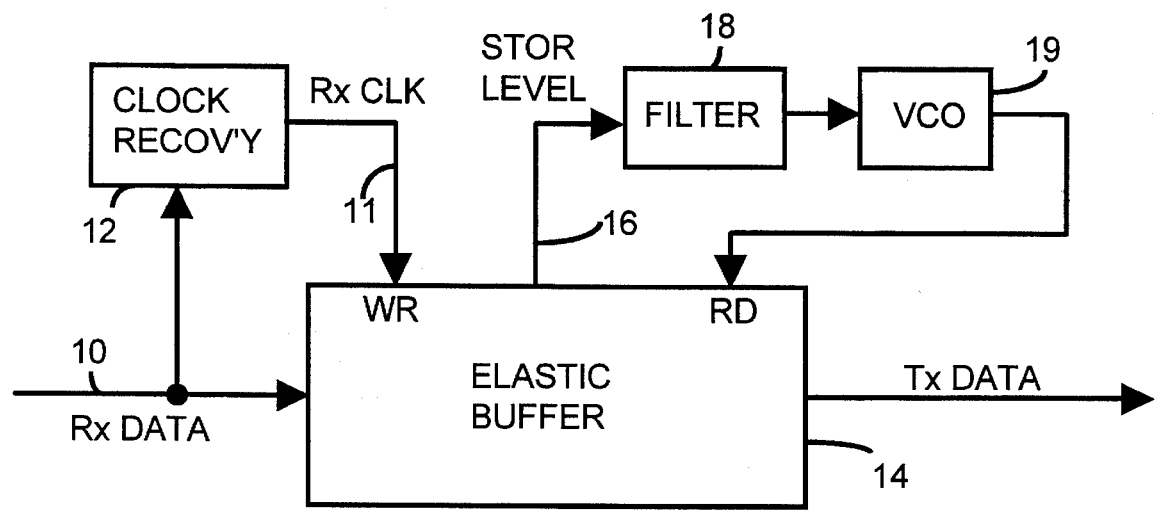
Fig. 1: Prior Art
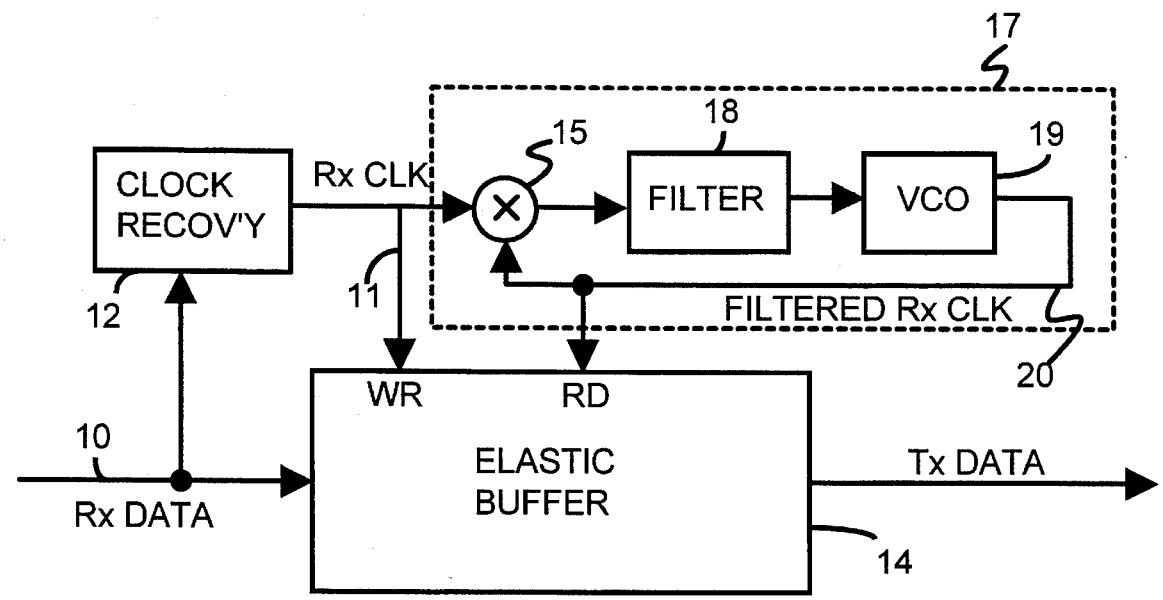
Fig. 2: Prior Art

DIGITAL JITTER ATTENUATOR USING SELECTION OF MULTI-PHASE CLOCKS AND AUTO-CENTERING ELASTIC BUFFER FOR A TOKEN RING NETWORK

BACKGROUND OF THE INVENTION—FIELD OF THE INVENTION

This invention relates to attenuation of clock jitter in a token-ring network, and more particularly to a digital jitter attenuator and auto-centered elastic buffer using phaseselection.

BACKGROUND OF THE INVENTION—DESCRIPTION OF THE RELATED ART

In synchronous transmission systems such as the Bell T1 carrier system and the Token-Ring local-area network, the clock is encoded with the data using well-known methods such as differential Manchester coding or alternate mark inversion (AMI). A receiving station will extract the clock from the coded data stream and provide this extracted receive clock and the data itself. The extracted receive clock is used to retransmit the data to the next station. When the stations are arranged in a ring topology, any distortion of the clock will be passed along from station to station, or clock distortion may even be amplified by each station.

The transmission media between the stations is non-ideal, acting as a low-pass filter. Sequences of the coded data stream having relatively denser transitions will appear as a higher-frequency portion of the data stream while other sequences of coded data having a lower density of transitions will appear as a lower-frequency portion of the data stream. The higher-frequency portions will tend to travel through the media in a shorter time than the lower-frequency portions. Thus the higher-frequency portions will appear to be shifted to an earlier time or phase relative to the lower-frequency portions. This phase shift of the higher-frequency portions of the coded data stream causes the clock extracted to also be phase-shifted during the time that the higher-frequency portions of the coded data stream are being received. This is one source of clock jitter.

Extraction and use of the phase-shifted clock will cause the re-transmitted data to also be phase shifted. The high-frequency portions of the data stream will increase in frequency with each re-transmission, resulting in increased jitter as the data stream is re-transmitted along the ring. Thus the need exists for attenuation of this jitter. The need is especially great in a ring topology where the jitter is amplified by each retransmitting station.

Jitter can be attenuated by a variety of methods. The jittery receive clock is typically filtered or smoothed out before being used as the transmit clock. An elastic buffer, such as a FIFO, is needed to buffer the difference in rates of receiving at the jittery receive clock's rate and transmitting the data at the smother transmit clock rate. FIG. P1 shows one prior-art approach discussed by J. C. Bellamy in Digital Telephony, pp 327–329, and published by Wiley in 1982. The jittery receive clock 11 is extracted by clock recovery circuit 12 from coded data stream 10. The jittery receive clock 11 is used to write data from the coded data stream 10 into an elastic buffer 14. A storage-level signal 16, such as a half-full flag of elastic buffer 14, is smoothed or filtered by filter 18 and used to control a voltage-controlled oscillator (VCO) 19. The clock outputted from the VCO is used to read data out of the elastic buffer 14, which is combined with the smoothed clock from the VCO to form the transmitted coded data stream using well-known line coding techniques.

The frequency of the smoothed transmit clock from the VCO 19 is varied by the filtered storage-level signal 16. Thus the elastic buffer itself is used to increase the transmit clock frequency when the buffer becomes too full, or decrease the transmit clock frequency when the buffer empties. The feedback loop of the elastic buffer 14, filter 18 and VCO 19 has a lower bandwidth and is less responsive, than the clock recovery circuit 12. Thus the frequency of the transmit clock is smoothed relative to the receive clock, and phase shifts in the receive clock are attenuated. The elastic buffer absorbs the instantaneous difference in frequency between the receive and transmit clocks, and the feedback loop using the storage-level signal 16 of the elastic buffer 14 forces the receive and transmit clocks to have the same average frequency.

FIG. 2 is another prior-art jitter attenuator, described by A. C. Marshall et al. in U.S. Pat. No. 5,090,025, assigned to Proteon, Inc. of Westboro, Mass. The received data from coded data stream 10 is again written into elastic buffer 14 by an extracted receive clock 11 from clock recovery circuit 12. However, the storage level of the elastic buffer is not used. Instead, a phase-locked loop 17 is constructed from VCO 19, filter 18, and phase comparator 15. Phase comparator 15 compares the phase of the extracted receive clock 11 to the phase of the filtered transmit clock 20 outputted from VCO 19. The phase difference is filtered by filter 18 and then used to control VCO 19. Thus the phase difference is used to control the frequency of the filtered transmit clock 20 outputted from VCO 19.

Since no feedback is provided from the elastic buffer 14, the elastic buffer may need to be re-centered, or filled until about half-full. Otherwise, the elastic buffer 14 could fill up (a data over-run) or empty out (a data under-run), causing a data error.

The VCO 19 is typically an analog circuit using a crystal oscillator. This is undesirable since crystal oscillators are typically not integrated onto an integrated circuit, increasing the cost and size of the system. Power-supply noise rejection is also a problem because the bandwidth of the phase-locked loop 17 or loop in FIG. 1 of the storage-level signal 16, filter 18, and VCO 19 is narrow in order to smooth the jittery receive clock. Tolerances of the analog components, such as capacitors in the filter, are tight and difficult to maintain.

What is desired is a fully-integrated jitter attenuator, one without the external crystal oscillator needed for the voltage-controlled oscillator. It is desired to integrate the jitter attenuator with other digital logic circuits in an integrated circuit (IC). A digital rather than analog implementation is desired to improve power-supply noise rejection, and to eliminate the tolerances needed by the analog components.

It is also desired to have feedback from the elastic buffer so that initialization and recentering of the elastic buffer is not necessary. It is also desired to have jitter attenuation that may be adjusted in degree.

SUMMARY OF THE INVENTION

A jitter attenuator uses digital multi-phase clocks, eliminating feedback to an analog voltage-controlled oscillator and allowing for integration into standard digital IC's.

A jitter attenuator receives a first clock and input data which may be separated from a coded data stream. The jitter attenuator buffers and re-transmits the input data with a second (transmit) clock. The second clock has less jitter than the first (received) clock. The jitter attenuator comprises an input divider which receives the first clock. The input divider generates a plurality of write clocks having a lower frequency than the first clock. The first clock has a frequency that is a multiple of the frequency of the write clocks.

An elastic buffer receives the input data at the rate of the first clock and provides the input data for re-transmission at the rate of the second clock. An output divider receives the second clock and generates a plurality of read clocks. The read clocks have a lower frequency than the second clock, and the second clock has a frequency that is a multiple of the frequency of the read clocks.

A plurality of multi-phase clocks is used for generating the second clock. A feedback loop receives the plurality of multi-phase clocks. The feedback loop adjusts the phase of the second clock in response to the difference in phase between at least one of the plurality of write clocks and at least one of the plurality of read clocks.

In other aspects of the invention, the write clock and the read clock are paired together so that on the average the elastic buffer will be half full. In further aspects of the invention the plurality of multi-phase clocks that generates the second clock is derived from an external oscillator that has a constant frequency. Thus the feedback loop is capable of being integrated on a single silicon substrate.

The feedback loop may itself comprise a phase comparator, which receives one of the plurality of write clocks and one of the plurality of read clocks. The phase comparator generates an increment signal if the write clock lags the read clock in phase, while the phase comparator generates a decrement signal if the write clock leads the read clock in phase.

A counter receives the increment and the decrement signal from the phase comparator. The counter increments a count value when the increment signal is received but decrements the count value when the decrement signal is received. The counter then outputs the count value.

A phase selector receives the count value from the counter and receives the plurality of multi-phase clocks. The phase selector selects a selected clock in a plurality of multi-phase clocks in response to the count value from the counter. Each higher count value from the counter selects a multi-phase clock having a greater phase offset. Thus the feedback loop adjusts the phase of the selected clock in response to the difference in phase between one of the write clocks and one of the read clocks.

BRIEF DESCRIPTION OF THE DRAWINGS

FIG. 1 is a block diagram of a prior-art jitter attenuator using the half-full signal.

FIG. 2 is a block diagram of a prior-art jitter attenuator using a PLL.

DETAILED DESCRIPTION

The present invention relates to an improvement in data transmission. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The token-ring local-area network (LAN) is described more fully in ANSI/IEEE standard 802.5. Stations are arranged in a ring, with each station receiving data and re-transmitting that data with a clock extracted from the received data stream. As the data is received and re-transmitted from station to station, clock phase shifts or jitter is amplified. A jitter attenuator is ideally included in the receive and re-transmit circuitry of one or more of the stations.

Figure 3:
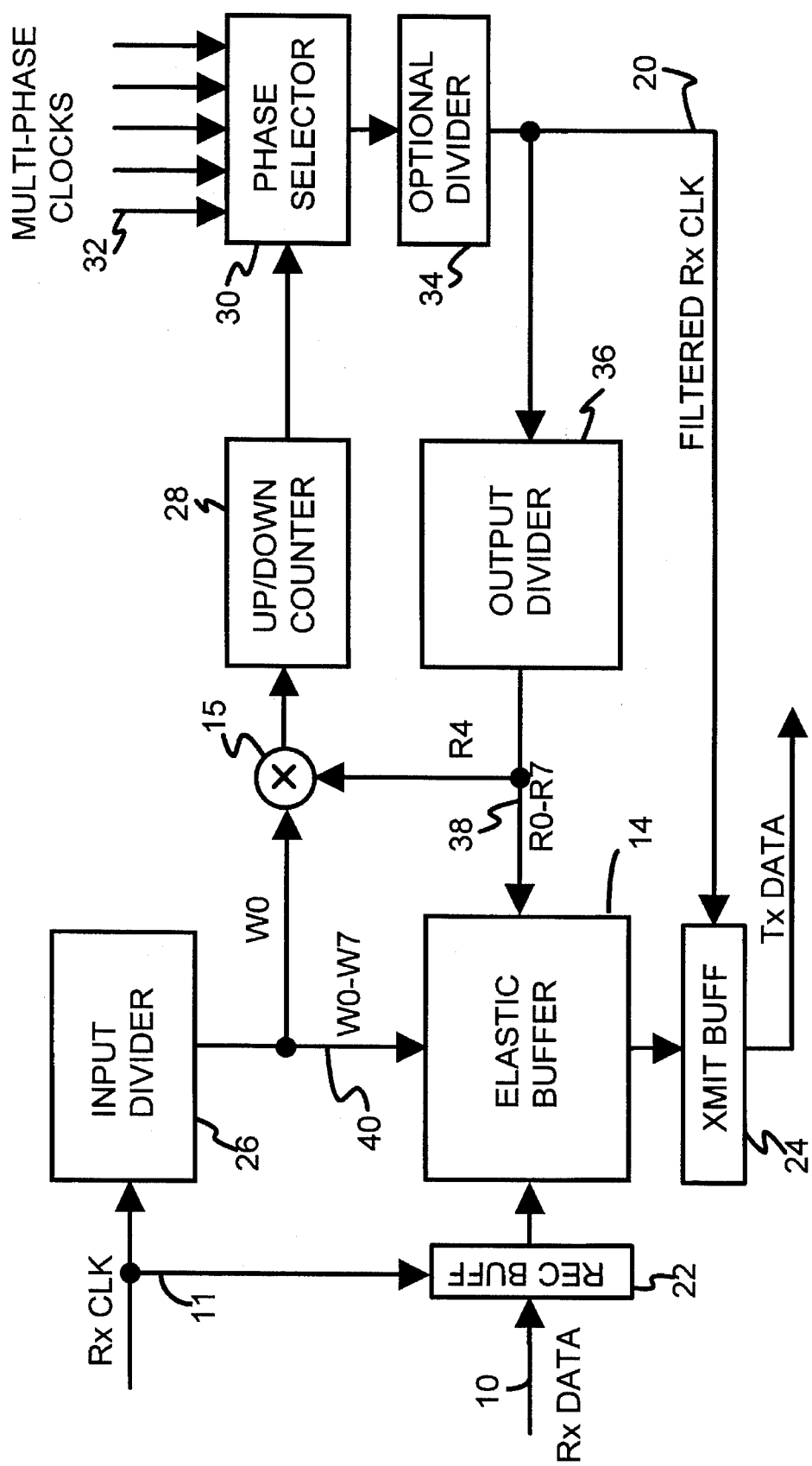
FIG. 3 is a block diagram of the jitter attenuator of the present invention.

FIG. 3 is a block diagram of the jitter attenuator of the present invention. The receive clock 11 and receive data 10 are extracted from the coded data stream received from the previous station in the ring. The clock separation can be accomplished by a clock recovery circuit as discussed in the prior art. Receive data 10 is serially clocked by the receive clock 11 into an 8-bit-wide receive buffer 22. Once the receive buffer is full, its contents are loaded in parallel into elastic buffer 14.

The 8-bit-wide receive buffer 22 is loaded into the elastic buffer 14 every eight periods of receive clock 11. Elastic buffer 14 is preferably organized into eight 8-bit words or rows. Each word is loaded from the receive buffer 22 into one of the eight rows in elastic buffer 14 by eight write clocks 40, designated W0–W7. Input divider 26 generates a write pulse on one of the eight write clocks 40 every eight receive clock periods. Each write clock has a write pulse every 64 periods of receive clock 11. Thus input divider 26 divides the receive clock 11 by 64, generating eight staggered pulses on write clocks 40.

Clocking the receive data 10 serially into receive buffer 22, and then loading the elastic buffer 14 in parallel allows elastic buffer 14 to operate at a lower clock rate. This simplifies the design of elastic buffer 14 and allows lower-cost components to be used for elastic buffer 14. On an integrated circuit great care is often required in laying out circuitry coupled to high-speed clocks. Using lower-speed clocks simplifies the layout and design work, often reducing the cost.

The 8-bit data words are read out of elastic buffer 14 in parallel into transmit buffer 24. Data bits are clocked out serially from transmit buffer 24 by a filtered receive clock 20, which is also used as the transmit clock. Output divider 36 generates the eight read clocks 38, which are used to read an 8-bit data word out of elastic buffer 14 and into transmit buffer 24. Output divider 36 also receives the filtered receive clock 20, and 30 divides this clock by 64, producing the eight read clocks 38. Each of the read clocks 38 has a read pulse every 64 periods of filtered receive clock 20. However, the read clocks 38 are staggered so that one read pulse occurs every 8 periods of filtered receive clock 20.

The first write clock, W0, is compared to the fifth read clock, R4, by phase comparator 15. Phase comparator 15 outputs a "down" signal if the phase of the write clock W0 is advanced relative to read clock R4, or outputs an "up" signal if the phase of the write clock W0 is retarded relative to read clock R4. Up/down counter 28 is decremented or incremented by the signal from phase comparator 15. The output of counter 28 causes phase selector 30 to select one of the multi-phase clocks 32. The selected one of the multi-phase clocks 32 is optionally divided by optional divider 34 to produce the filtered receive clock 20.

A feedback loop is thus formed to control the frequency of the filtered receive clock. The feedback loop includes phase comparator 15, up/down counter 28, and phase selector 30. The output divider 36 is also in the loop, and an optional divider 34 may be included in the feedback loop. The loop is controlled by the phase difference between the write clocks and the read clocks that are writing and reading parallel data into the elastic buffer. Since these clocks operate at one-sixty-fourth (1/64th) the frequency of the receive clock, the feedback loop has a narrower bandwidth than a first loop recovering the receive clock from the data stream. The narrower bandwidth smoothes or filters the jitter in the receive clock, achieving jitter attenuation in the filtered receive clock.

By comparing W0 to R4, the elastic buffer is forced toward being half-full. Thus the elastic buffer is centered. Initialization of the elastic buffer is not necessary, since the elastic buffer will move from empty to half-full as a result of the comparison of the write and read clocks that are separated by half of the elastic buffer's depth.

MULTI-PHASE CLOCKS AND FEEDBACK LOOP

Figure 4:
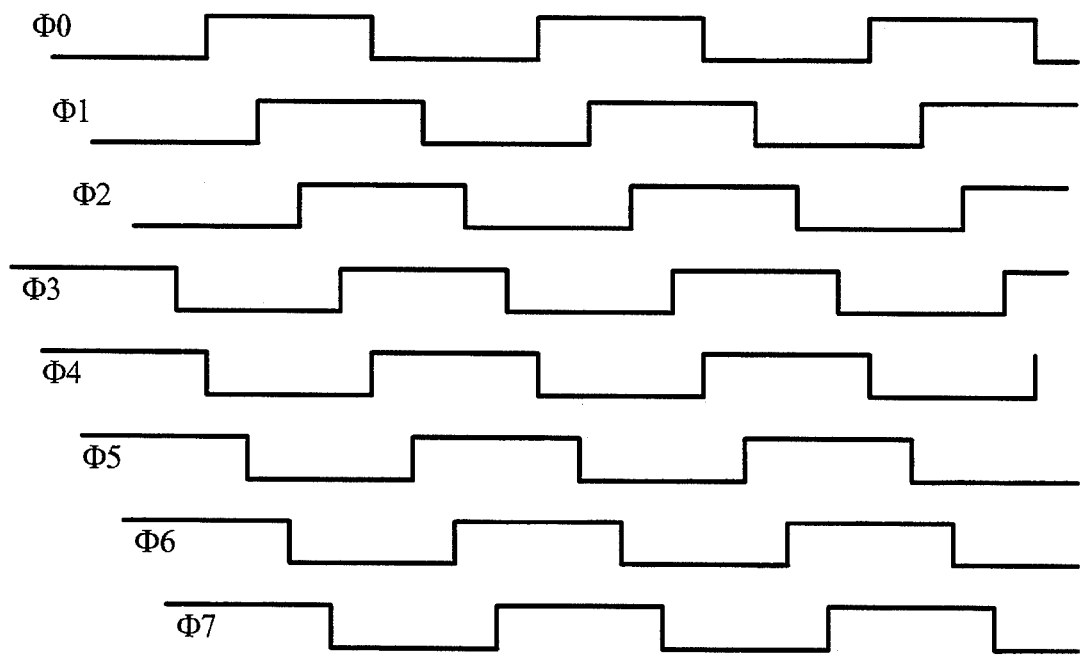
FIG. 4 is a waveform diagram of the multi-phase clocks.

FIG. 4 is a waveform diagram of the multi-phase clocks 32. There are preferably eight clocks staggered in phase and having equal phase offsets to each other. These multi-phase clocks are designated $\phi 0$ to $\phi 7$. Although not necessary in all embodiments, the phase offset is preferably one-eight of the period of the multi-phase clocks. Thus $\phi 7$ is advanced in phase by one-eight of a period to $\phi 0$.

Figure 5:
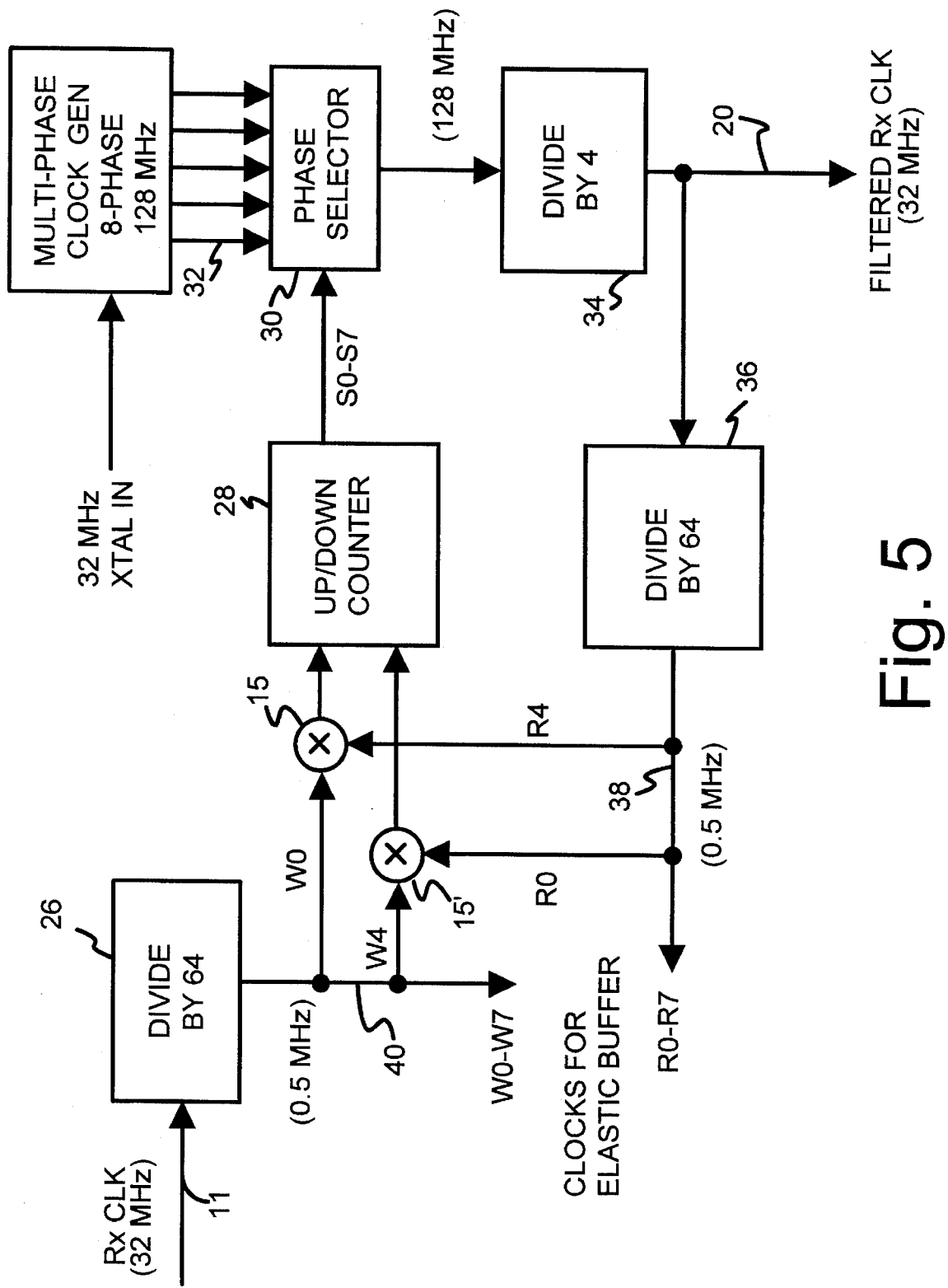
FIG. 5 highlights the feedback loop components in the preferred embodiment.

FIG. 5 highlights from FIG. 3 the feedback loop components in the preferred embodiment. The multi-phase clocks of FIG. 4 are generated using a conventional analog phase-locked loop from a 32 MHz external crystal oscillator. Power-supply noise-rejection is maximized by using a wide bandwidth for the analog phase-locked loop. The 32 MHz external crystal clock is multiplied by four to 128 MHz and phase-shifted to produce the eight multi-phase clocks 32.

The high frequency of the multi-phase clocks 32 allows for fine adjustments to the filtered receive clock 20. The phase difference between any two adjacent multi-phase clocks 32 is approximately 1 nanosecond (ns), or one-eight of the 128 MHz clock period. Phase selector 30 can adjust the phase of the filtered receive clock 20 by as little as 1 ns by selecting an adjacent one of the multi-phase clocks 32.

Phase selector 30 may be implemented as transmission gates to select one of the eight multi-phase clocks 32 in response to eight select signals S0–S7 from the up/down counter 28. Only one of the eight select signals S0–S7 from the up/down counter 28 will be active at any time. Because the frequency of the multi-phase clocks 32 (128 Mhz) is much higher that the rate that the select signals S0–S7 change, a simple transmission-gate implementation for phase selector 30 will not appreciably distort the final 32 MHz filtered receive clock 20, which is further divided by four from the multi-phase clocks 32 by optional divider 34.

Output divider 36 divides the filtered receive clock 20 by 64, producing eight nonoverlapping read clocks 38, R0–R7. These clocks are staggered in phase to each other, as described earlier. These read clocks 38 operate at about 0.5 Mhz, one 64th of the frequency of filtered receive clock 20. Likewise input divider 26 divides the receive clock 11 by 64, producing eight non-overlapping write clocks 40, R0–R7.

These clocks are staggered in phase to each other, as described earlier. These write clocks 40 also operate at about 0.5 Mhz, one 64th of the frequency of receive clock 11. Each individual write clock operates at 0.5 Mhz, but any one of the eight write clocks is loading data into the elastic buffer at eight times this rate, or at 4 Mhz.

Phase comparator 15 compares the phase of the first write clock, W0, to the phase of the fifth read clock, R4, producing an increment/decrement signal to the up/down counter 28. The up/down counter 28 produces an output representing a 3-bit binary count. This 3-bit binary count value is decoded into eight select lines S0–S7, only one of which is active at any time (one-hot encoding). Thus the active select line will select one of the eight multi-phase clocks 32.

The up/down counter 28 is incremented when the phase of R4 leads W0. This indicates that the writes are occurring more slowly than the reads and the transmit clock (filtered receive clock) must be slowed down or retarded in phase. The rising edge of W0 will cause phase comparator 15 to output an increment signal to up/down counter 28 because the phase of W0 is behind R4. Up/down counter 28 will increment, causing the next larger-numbered select line to become active. Phase selector 30 will thus select the next-larger phase-offset clock of the multi-phase clocks 32. This next clock will be retarded an additional 1 ns. This will result in the filtered receive clock 20 being retarded by 1 ns.

The up/down counter 28 is incremented when the phase of R4 leads W0. It is decremented when the phase of R4 is behind W0. The increment or decrement signal is generated at the leading edge of the W0 clock. Thus an increment or decrement can occur once every period of the W0 clock. The period of the W0 clock is determined by the input divider 26. Input divider 26 thus determines the maximum rate that the counter can be incremented, which is the rate that the phase of the filtered receive clock 20 can be changed. This rate of change is the degree of jitter attenuation or smoothing of the input receive clock 11.

A higher rate of change in the phase of the filtered receive clock reduces the degree of jitter attenuation, but may be desired for some environments. The rate of change may be doubled by adding a second phase comparator 15'. This second phase comparator 15' compares the phase of the fifth write clock W4 to the first read clock R0. A second increment/decrement signal is generated to the up/down counter 28 which can increment or decrement in response to signals from either phase comparators 15 or 15'. Thus two increments or decrements can occur during every period of the write clocks W0–W7.

The degree of jitter attenuation may be selectively varied by enabling or disabling the second phase comparator 15'. Disabling the second phase comparator 15' will result in only one increment or decrement for every period of the write clocks. Thus the phase can be updated at 0.5 Mhz, the frequency of the write clocks 40. Enabling the second phase comparator 15' will allow for a second increment or decrement during each period of the write clocks 40, for a phase update rate of 1.0 Mhz. The degree of jitter attenuation can be lessened further by enabling additional phase comparators (not shown). For example, a third phase comparator could compare W1 to R5, a fourth phase comparator could compare W2 to R6, and others W3 to R7, W5 to R1, W6 to R2, and W7 to R3. Thus the bandwidth of the feedback loop can be increased and the degree of jitter attenuation reduced by enabling additional phase comparators. They can be enabled as a mask options or as a programmable option, even during operation while installed on the token-ring network.

OPERATION OF UP/DOWN COUNTER AND PHASE SELECTOR

Figure 8:
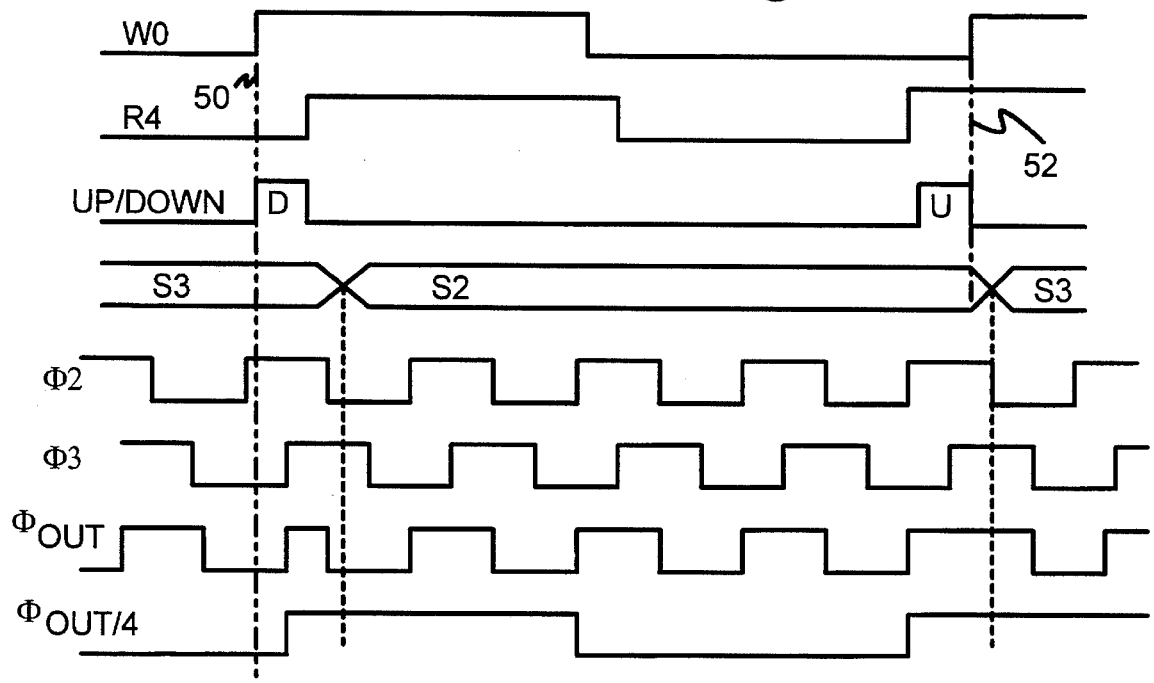
FIG. 8 is a timing diagram illustrating the operation of the feedback loop.

FIG. 8 is a timing diagram illustrating the operation of phase comparator 15, up/down counter 28, and phase selector 30. Write clock W0 is compared to read clock R4 in phase comparator 15. As can be seen in FIG. 8, at time 50 W0 leads R4 in phase, causing phase comparator 15 to generate a decrement pulse. Up/down counter 28 decrements its count, which was at 3, to the value 2. Thus select line S3 goes inactive while select line S2 becomes active shortly after time 50. Phase selector 30 was outputting multi-phase clock φ3 while S3 was active before time 50, but switches to outputting multi-phase clock φ2 after S2 becomes active shortly after time 50. Clock φ2 is advanced in phase by 1ns from clock φ3. Thus the clock output from the phase selector, φout, shifts in phase earlier by 1 ns shortly after time 50 as φ3 is replaced by φ2. Optional divider 34 divides φout by four, but retains the 1 ns phase shift added after time 50.

On the next rising edge of write clock W0, at time 52, phase of W0 lags R4, causing phase comparator 15 to generate an increment (up) pulse. Up/down counter 28 increments its count, which was at 2, to the value 3. Thus select line S2 goes inactive while select line S3 again becomes active shortly after time 52. Phase selector 30 was outputting multi-phase clock φ2 while S2 was active shortly after time 50 but before time 52, but switches to outputting multi-phase clock φ3 after S3 becomes active after time 52. Clock φ3 is retarded in phase by 1 ns from clock φ2. Thus the clock output from the phase selector, φout, shifts in phase later by 1 ns after time 52 as φ2 is replaced by φ3.

For illustrative purposes in FIG. 8, the frequency of multi-phase clocks φ2 and φ3 was drawn as four times the frequency of W0 and R4. In the preferred embodiment, the multi-phase clocks operate at 128 Mhz, which is 256 times the 0.5 MHz frequency of W0 and R4. Phase shifts were also exaggerated.

ELASTIC BUFFER

Figure 6:
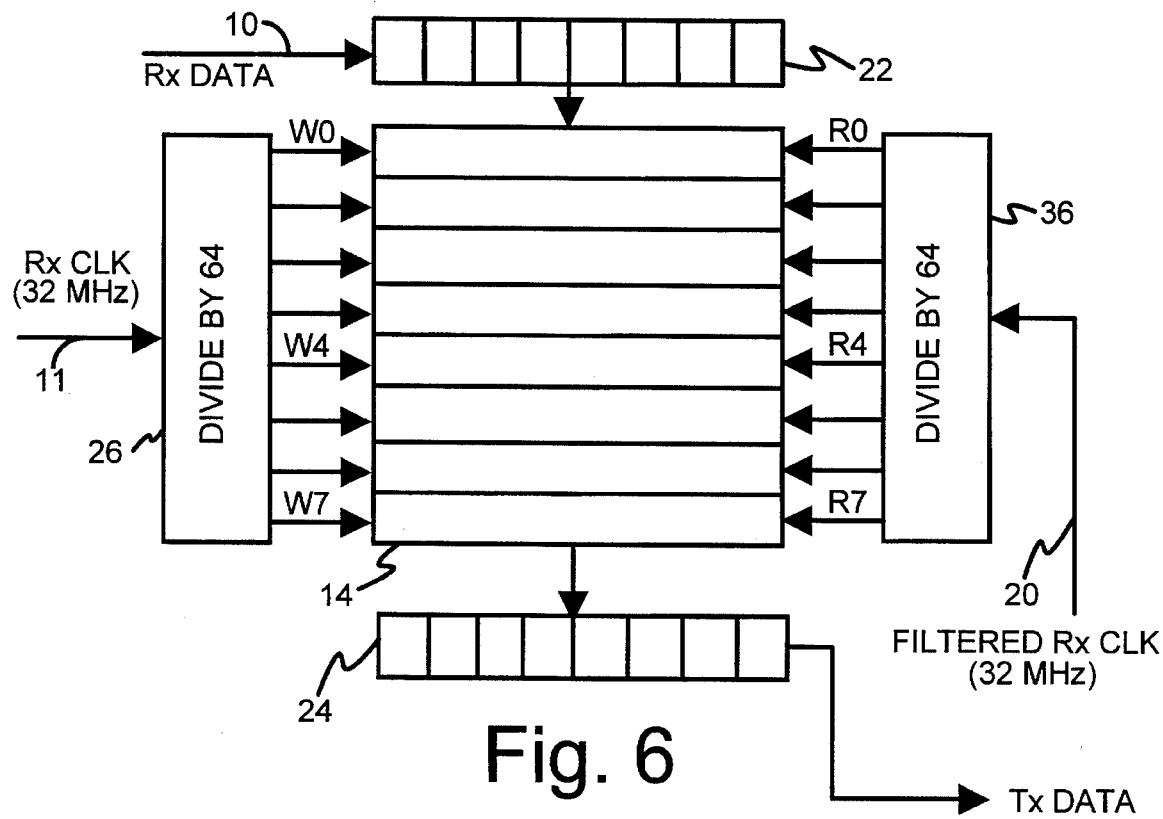
FIG. 6 is a detailed diagram of the elastic buffer.

FIG. 6 is a detailed diagram of the elastic buffer. Serial data is input over receive data line 10 and clocked into receive buffer 22 by receive clock 11. Once receive buffer 22 is full, with 8 bits of data, receive buffer 22 is loaded in parallel into one of the 8 rows of elastic buffer 14. The receive clock 11 is divided by 64 by input divider 26, generating 8 write clocks, W0-W7. Each write clock loads an 8-bit row of data from the receive buffer 2 into a row of elastic buffer 14.

The filtered receive clock 20, which is the clock used for transmitting the data, is likewise divided by 64 by output divider 36, producing 8 read clocks R0–R7. Each of the read clocks reads an 8-bit row of data from elastic buffer 14 into the transmit buffer 24. Data is clocked out of transmit buffer 24 in a serial fashion by filtered receive clock 20. Once the receive buffer is empty, another row from elastic buffer 14 is read by another one of the read clocks R0–R7.

DIVIDERS DETERMINE JITTER ATTENUATION

The value of the input and output dividers determines the amount of jitter attenuation. More attenuation is achieved by increasing the size of the dividers because an increment or decrement signal is generated less often. For example, using a divide by 128 rather than a divide by 64 would allow for one increment/decrement and phase shift every 128 periods of the receive clock, rather than one phase shift every 64 periods. Thus more attenuation would be achieved. The width of the receive and transmit buffers, and the rows in the elastic buffer, can be reduced to 4 bits if the overall capacity of the elastic buffer is to be maintained.

Figure 7:
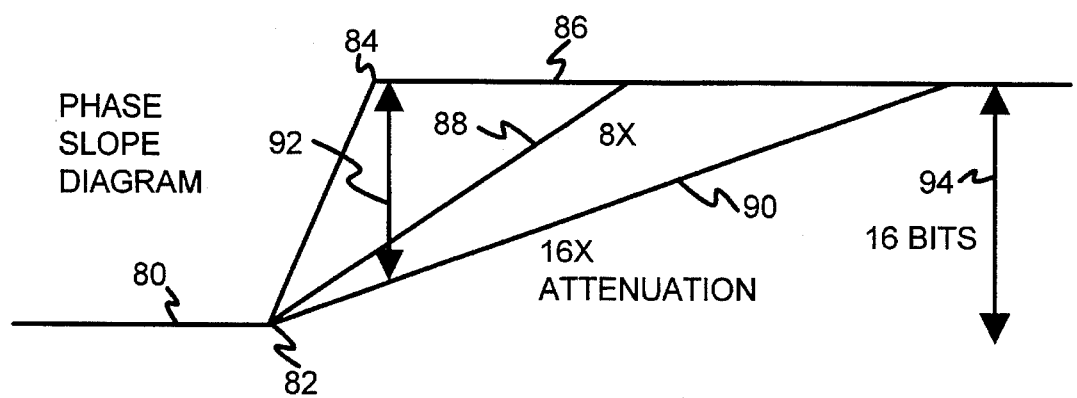
FIG. 7 shows a phase slope diagram.

FIG. 7 shows a phase slope diagram. At time 80 and at time 86, the receive clock is operating at the average frequency and the phase is not changing. Suddenly, from time 82 to time 84, there is a constant change in phase, a phase slope. A resultant increase in frequency also occurs during the interval between time 82 and 84, as frequency is the derivative of phase.

Line 94 is the anticipated accumulated, or total, jitter for all stations in the ring. Sixteen bits is the peak jitter. To buffer peak-to-peak jitter for both positive and negative phase slope, a total of 32 bits is required for the elastic buffer. Since Manchester coding requires two Manchester bits per bit, the buffer should be 64 Manchester bits in size. Preferably, the bits stored in the elastic buffer are Manchester bits.

Line 92 is the minimum peak buffer depth required to avoid data loss for 16× attenuation. Enabling just one phase comparator achieves 16× attenuation. The slope of line 90 is:

phase slope$_{16\times}$=1ns (phase resolution of multi-phase clocks)/64 clocks, where 64 clocks occur between each phase compare and increment or decrement. Enabling 2 phase comparators doubles the rate of phase comparison to achieve 8× attenuation:

phase slopes$_{8\times}$=1ns (phase resolution of multi-phase clocks)/32 clocks, where two phase comparisons occur every 64 clocks, or one every 32 clocks. The input receive clock is assumed to have a constant slope of 1 ns for every 4 clocks. This slope of line 96 is 8 times the slope of 8× line 88 and 16 times the slope of 16× line 90.

With 8× jitter attenuation, the filtered receive clock will also increase in frequency, but at a lower, attenuated rate indicated by line 88. Higher attenuation, such as 16×, is less responsive to the sudden change at time 82, and follows the line 90. The lines in FIG. 7 are for illustration and are not drawn to scale.

ADVANTAGES OF THE INVENTION

The inventors have recognized that many prior-art systems vary the frequency of the transmit clock using a voltage-controlled oscillator. If the phase, instead of the frequency, of the transmit clock can be varied, the desired effect can be achieved. The phase selector of the present invention allows for very fine phase shifts to occur. These phase shifts can add up to a whole clock period that is added or subtracted from the nominal transmit clock. This allows for gradual adjustment to changes in the receive clock. Thus the invention adjusts the phase from a constant-frequency clock source, rather than a variable-frequency clock source. This removes the feedback necessary to the crystal oscillator or VCO. Since the VCO is normally external to the IC or silicon substrate, the feedback loop must go off the silicon substrate to the VCO. Replacing the VCO with a constant-frequency oscillator eliminates this feedback to the external oscillator. Thus the entire feedback loop can be integrated onto a single silicon substrate, with a constant-frequency oscillator external to the silicon substrate.

Comparing the phases of the clocks for reading and writing to the elastic buffer can eliminate the need for logic to determine if the elastic buffer is centered, such as half-full detect logic. Often this half-full logic is complex and expensive.

ALTERNATE EMBODIMENTS

Several other embodiments are contemplated by the inventors. For example, the duty cycle of the write clocks and read clocks can be varied, depending upon the exact requirements of the write and read circuitry in the elastic buffer. Polarities of clock and signals such as the select signals may also be inverted. Other types of counter besides binary up/down counters may be substituted, and other encodings besides binary, such as gray code, may be used. A smaller or larger number of multi-phase clocks may be used simply by enlarging or reducing the up/down counter and phase selector. The numbering or mapping of the multi-phase clocks may be reversed such that a decrement, rather than an increment signal is needed for correction. Frequencies are illustrative only and may be varied by modification of the dividers disclosed herein.

The phase comparator may be combined with the up/down counter by using W0 as the clock of the counter and R4 as an increment/decrement input. Many other implementations are possible for these components.

The increment or decrement signals from the phase comparator may be implemented as more than one discrete signal. Indeed, phase comparator 15 could be combined with the up/down counter by using W0 as the clock of the counter, and R4 as the increment signal. When R4 leads W0, and increment is signaled because R4 is high before the W0 clock edge, while a decrement is signaled when R4 lags W0, because R4 is low at the W0 clock edge. Setup and hold times need to be carefully evaluated.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A jitter attenuator, receiving a first clock and input data, the jitter attenuator buffering and re-transmitting the input data with a second clock, the second clock having less jitter than the first clock, the jitter attenuator comprising:

an input divider, receiving the first clock, for generating a plurality of write clocks, the write clocks having a lower frequency than the first clock, the first clock having a frequency that is a multiple of the frequency of the write clocks;

an elastic buffer, receiving the input data at the rate of the first clock and providing the input data for re-transmission at the rate of the second clock;

an output divider, receiving the second clock, for generating a plurality of read clocks, the read clocks having a lower frequency than the second clock, the second clock having a frequency that is a multiple of the frequency of the read clocks;

a plurality of multi-phase clocks for generating the second clock;

a feedback loop, receiving the plurality of multi-phase clocks, for adjusting the phase of the second clock by selecting a clock in the plurality of multi-phase clocks for generating the second clock in response to the difference in phase between at least one of the plurality of write clocks and at least one of the plurality of read clocks;

whereby jitter in the first clock is attenuated in the second clock.

2. The jitter attenuator of claim 1 wherein:

the plurality of multi-phase clocks for generating the second clock is derived from an external oscillator, the external oscillator having a constant frequency, whereby the feedback loop is capable of being integrated on a single silicon substrate.

3. The jitter attenuator of claim 2 wherein the feedback loop comprises:

a phase comparator, receiving the at least one of the plurality of write clocks and the at least one of the plurality of read clocks, the phase comparator generating an increment signal when the at least one of the plurality of write clocks lags the at least one of the plurality of read clocks in phase, the phase comparator generating a decrement signal when the at least one of the plurality of write clocks leads the at least one of the plurality of read clocks in phase;

a counter receiving the increment and the decrement signal from the phase comparator, the counter incrementing a count value when the increment signal is received but decrementing the count value when the decrement signal is received, the counter outputting the count value;

a phase selector, receiving the count value from the counter and receiving the plurality of multi-phase clocks, the phase selector selecting a selected clock in a plurality of multi-phase clocks in response to the count value from the counter;

whereby the feedback loop adjusts the phase of the selected clock in response to the difference in phase between the at least one of the plurality of write clocks and the at least one of the plurality of read clocks.

4. The jitter attenuator of claim 3 wherein the selected clock is the second clock.

5. The jitter attenuator of claim 3 further comprising:

an optional divider, the optional divider receiving the selected clock and outputting the second clock, the optional divider generating the second clock, the second clock having a lower frequency than the selected clock, the selected clock having a frequency that is a multiple of the frequency of the second clock, whereby the second clock is divided from the selected clock.

6. The jitter attenuator of claim 3 wherein:

a first location in the elastic buffer is written by the at least one of the plurality of write clocks; and a second location is read by the at least one of the plurality of read clocks, the first location being separated from the second location by substantially half of the storage capacity of the elastic buffer, whereby the elastic buffer is forced into being half-full by the phase comparison of a read clock and write clock that are separated by substantially half of the storage capacity of the elastic buffer.

7. The jitter attenuator of claim 6 further comprising:

a second phase comparator, receiving a second one of the plurality of write clocks and a second one of the plurality of read clocks, the second phase comparator generating a second increment signal when the second one of the plurality of write clocks lags the second one of the plurality of read clocks in phase, the second phase comparator generating a second decrement signal when the second one of the plurality of write clocks leads the second one of the plurality of read clocks in phase;

the counter receiving the second increment and the second decrement signal from the second phase comparator, the counter incrementing the count value when the second increment signal is received but decrementing the count value when the second decrement signal is received, whereby the counter is capable of being incremented or decremented by two phase comparisons, reducing the degree of jitter attenuation of the feedback loop.

8. The jitter attenuator of claim 6 wherein the elastic buffer comprises:

eight rows of data, each row of data holding 8 bits of data;

a receive buffer, serially receiving the input data, the receive buffer loading 8 bits of data into one of the eight rows of data in response to one of the plurality of write clocks;

a transmit buffer, serially transmitting data, the transmit buffer being loaded with 8 bits of data from one of the eight rows of data in response to one of the plurality of read clocks;

whereby the eight rows of data in the elastic buffer has a storage capacity of 64 bits of data.

9. The jitter attenuator of claim 8 wherein the plurality of write clocks comprises 8 write clocks, and the plurality of read clocks comprises 8 read clocks, whereby an increment signal is generated at most once every 64 periods of the first clock.

10. The jitter attenuator of claim 9 wherein the plurality of multi-phase clocks comprise eight clocks separated by equal phase offsets.

11. A jitter attenuator, receiving a first clock and input data, the jitter attenuator buffering and re-transmitting the input data with a second clock, the second clock having less jitter than the first clock, the jitter attenuator comprising:

input divider means, receiving the first clock, for generating a plurality of write clocks, the write clocks having a lower frequency than the first clock, the first clock having a frequency that is a multiple of the frequency of the write clocks;

an elastic buffer, receiving the input data at the rate of the first clock and providing the input data for re-transmission at the rate of the second clock;

output divider means, receiving the second clock, for generating a plurality of read clocks, the read clocks having a lower frequency than the second clock, the second clock having a frequency that is a multiple of the frequency of the read clocks;

a plurality of multi-phase clocks for generating the second clock;

feedback loop means, receiving the plurality of multi-phase clocks, for adjusting the phase of the second clock by selecting a clock in the plurality of multi-phase clocks for generating the second clock in response to the difference in phase between at least one of the plurality of write clocks and at least one of the plurality of read clocks;

whereby jitter in the first clock is attenuated in the second clock.

12. The jitter attenuator of claim 11 wherein the plurality of multi-phase clocks for generating the second clock is derived from an external oscillator, the external oscillator having a constant frequency, whereby the feedback loop means is capable of being integrated on a single silicon substrate.

13. The jitter attenuator of claim 12 wherein the feedback loop means comprises:

phase comparator means, receiving the at least one of the plurality of write clocks and the at least one of the plurality of read clocks, for generating an increment signal when the at least one of the plurality of write clocks lags the at least one of the plurality of read clocks in phase, the phase comparator means generating a decrement signal when the at least one of the plurality of write clocks leads the at least one of the plurality of read clocks in phase;

counter means, receiving the increment and the decrement signal from the phase comparator means, for incrementing a count value when the increment signal is received but for decrementing the count value when the decrement signal is received, the counter means outputting the count value;

phase selector means, receiving the count value from the counter means and receiving the plurality of multi-phase clocks, the phase selector means selecting a selected clock in a plurality of multi-phase clocks in response to the count value from the counter means;

whereby the feedback loop means adjusts the phase of the selected clock in response to the difference in phase between the at least one of the plurality of write clocks and the at least one of the plurality of read clocks.

14. The jitter attenuator of claim 13 wherein the selected clock is the second clock.

15. The jitter attenuator of claim 13 further comprising:

optional divider means, the optional divider means receiving the selected clock and outputting the second clock, for generating the second clock, the second clock having a lower frequency than the selected clock, the selected clock having a frequency that is a multiple of the frequency of the second clock, whereby the second clock is divided from the selected clock.

16. The jitter attenuator of claim 13 wherein:

a first location in the elastic buffer is written by the at least one of the plurality of write clocks; and a second location is read by the at least one of the plurality of read clocks, the first location being separated from the second location by substantially half of the capacity of the elastic buffer, whereby the elastic buffer is forced into being half-full by the phase comparison of a read clock and a write clock that are separated by substantially half of the capacity of the elastic buffer.

* * * * *